(12) United States Patent
Lin (10) Patent No.: US 12,453,019 B2
(45) Date of Patent: Oct. 21, 2025

(54) AUTOMATICALLY SWITCHING OPERATION MODES ELECTRONIC DEVICE

(71) Applicant: QISDA CORPORATION, Taoyuan (TW)

(72) Inventor: Ting-Yi Lin, Taipei (TW)

(73) Assignee: Qisda Corporation, Taoyuan (TW)

( * ) Notice: Subject to any disclaimer, the term of this patent is extended or adjusted under 35 U.S.C. 154(b) by 287 days.

(21) Appl. No.: 18/136,864

(22) Filed: Apr. 19, 2023

(65) Prior Publication Data

US 2024/0081002 A1 Mar. 7, 2024

(30) Foreign Application Priority Data

Sep. 6, 2022 (CN) .......................... 202211081889.1

(51) Int. Cl.
- *H05K 5/02* (2006.01)
- *H01R 12/71* (2011.01)
- *H01R 13/502* (2006.01)
- *H04M 1/02* (2006.01)

(Continued)

(52) U.S. Cl.
CPC .......... *H05K 5/0208* (2013.01); *H01R 12/71* (2013.01); *H01R 13/502* (2013.01); *H04M 1/0277* (2013.01); *H05K 1/18* (2013.01); *H05K 7/1427* (2013.01); *H05K 5/0217* (2013.01); *H05K 2201/10053* (2013.01)

(58) Field of Classification Search
CPC ...... H05K 5/0208; H05K 1/18; H05K 7/1427; H05K 2201/10053; H05K 5/0275; H05K 5/0277; H05K 2201/0912; H05K 5/0217; G06F 21/86; G06F 21/88; G06F 21/78; H01R 12/71; H01R 13/502; H04M 1/0277

See application file for complete search history.

(56) References Cited

U.S. PATENT DOCUMENTS

| | | | |
|---|---|---|---|
| 6,266,720 B1 * | 7/2001 | Kakinoki | G06K 7/0013 710/63 |
| 6,913,469 B2 * | 7/2005 | Chiang | H01R 13/2435 439/862 |
| 9,055,143 B2 * | 6/2015 | Kim | H04M 1/02 |

(Continued)

FOREIGN PATENT DOCUMENTS

| | | | | |
|---|---|---|---|---|
| CN | 105279461 A | * | 1/2016 | G06F 21/86 |
| CN | 112996219 A | * | 6/2021 | H05K 1/0275 |

*Primary Examiner* — Allen L Parker
*Assistant Examiner* — Martin Antonio Asmat Uceda (57) ABSTRACT

An electronic device having a function of automatically switching operation modes includes a circuit board, a first case, a second case, and a connector. The second case is assembled with the first case to form an accommodating space. The circuit board is disposed inside the accommodating space. The connector is disposed on the first case and applied for the circuit board. The connector can include a first contacting portion and a second contacting portion. The second contacting portion is equipped with the first contacting portion. The first contacting portion is pressed by the second case and drive deformation of the second contacting portion, and the second contacting portion contacts the circuit board to keep in a first operation mode. When the second case is removed from the first case, the second contacting portion is resiliently recovered and the circuit board is switched to a second operation mode.

19 Claims, 8 Drawing Sheets

(51) Int. Cl.
*H05K 1/18* (2006.01)
*H05K 7/14* (2006.01)

(56) References Cited

U.S. PATENT DOCUMENTS

| | | | | |
|---|---|---|---|---|
| 9,324,511 | B2* | 4/2016 | Chang | H01H 13/183 |
| 9,721,439 | B2* | 8/2017 | Tanaka | G06K 7/0021 |
| 9,760,127 | B2* | 9/2017 | Sugiyama | G06F 21/86 |
| 9,784,467 | B2* | 10/2017 | Adamik | H05F 3/00 |
| 10,312,611 | B2* | 6/2019 | Shah | H01R 13/15 |
| 10,446,913 | B2* | 10/2019 | Jo | H01Q 1/50 |
| 10,595,400 | B1* | 3/2020 | Razaghi | H05K 1/0275 |
| 11,291,129 | B2* | 3/2022 | Koo | H01R 13/24 |
| 11,429,755 | B2* | 8/2022 | Westphall | G06F 1/182 |
| 11,723,145 | B2* | 8/2023 | Žniderič | H05K 1/0257 |
| | | | | 361/91.1 |
| 2018/0081400 | A1* | 3/2018 | Pandya | F16J 15/064 |
| 2022/0374051 | A1* | 11/2022 | Go | G06F 1/1658 |

\* cited by examiner

AUTOMATICALLY SWITCHING OPERATION MODES ELECTRONIC DEVICE

BACKGROUND OF THE INVENTION

1. Field of the Invention

The present invention relates to an electronic device for storing data, and more particularly, to an electronic device having a function of automatically switching its operation mode for restricting data access.

2. Description of the Prior Art

A portable electronic device has advantages of lightweight and comfortable operation, but the portable electronic device is easy to be stolen due to its small size. For avoiding the loss of the portable electronic device and the internal electronic data, conventional solution disposes the conductive rubber between the case and the internal circuit board of the portable electronic device. Two ends of the conductive rubber are respectively connected to the case and the circuit board; if the case is disassembled, the conductive rubber will break to trigger the data locking mechanism of the circuit board for preventing the internal electronic data from theft. However, the conductive rubber is pressed when the case is assembled, so that the conductive rubber has a large amount of deformation and cannot immediately respond to a situation that the case is disassembled, and the data may be stolen due to the foresaid drawback. Therefore, design of an electronic device of immediately detecting disassembly of the case to restrict data access is an important issue in the related mechanical design industry.

SUMMARY OF THE INVENTION

The present invention provides an electronic device having a function of automatically switching its operation mode for restricting data access for solving above drawbacks.

According to the claimed invention, an electronic device having a function of automatically switching operation modes includes a circuit board, a first case, a second case, and a connector. The circuit board has a first operation mode and a second operation mode. The second case is assembled with the first case to form an accommodating space, and the circuit board is accommodated inside the accommodating space. The connector is disposed on the first case and applied for the circuit board. The connector includes a first contacting portion and a second contacting portion. The second contacting portion is equipped with the first contacting portion. The first contacting portion is pressed by the second case and drives deformation of the second contacting portion, so as to contact the second contacting portion against the circuit board to keep the circuit board in a first operation mode. The second contacting portion is resiliently recovered to switch the circuit board into a second operation mode when the second case is removed.

According to the claimed invention, an electronic device having a function of automatically switching operation modes includes a circuit board, a first case, a second case, and a connector. The circuit board has a plurality of operation modes. The circuit board is disposed on the first case. The second case is assembled with the first case in a detachable manner. The connector is disposed on the first case and contacts against the second case in a separable manner. The connector is deformed to trigger the circuit board for switching its operation mode in response to the second case disassembled from the first case.

The electronic device of the present invention can utilize the connector to detect whether the first case and the second case are assembled with or disassembled from each other. The connector can include the first contacting portion and the second contacting portion with the same or different structural heights. Height difference in the first contacting portion and the second contacting portion can depend on inner design of the electronic device. The first contacting portion can be equipped with the second contacting portion, and the first contacting portion and the second contacting portion can respectively contact against the second case and the circuit board. If a locking mechanism between the first case and the second case is slightly unfixed, the pressure of the second case applied to the connector can be immediately changed, and the connector can be resiliently deformed to separate the second contacting portion from the switch circuit, so as to trigger the circuit board to shut down the reading function and avoid the data from theft. The data stored in the circuit board cannot be read even if the second case is locked back to the first case, and the circuit board can optionally output a warning message to an owner of the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
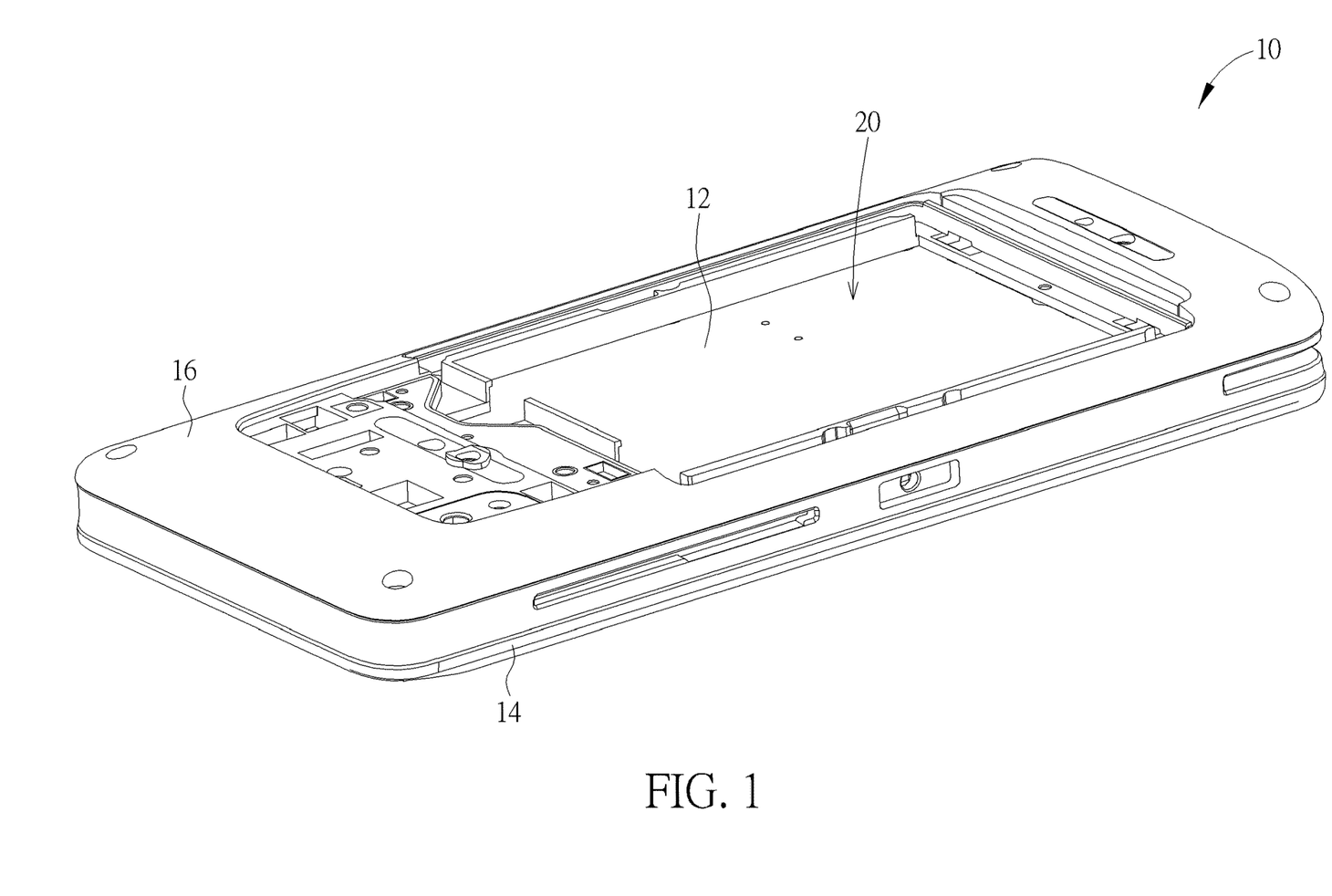
FIG. 1 is a diagram of an electronic device according to an embodiment of the present invention.
Figure 2:
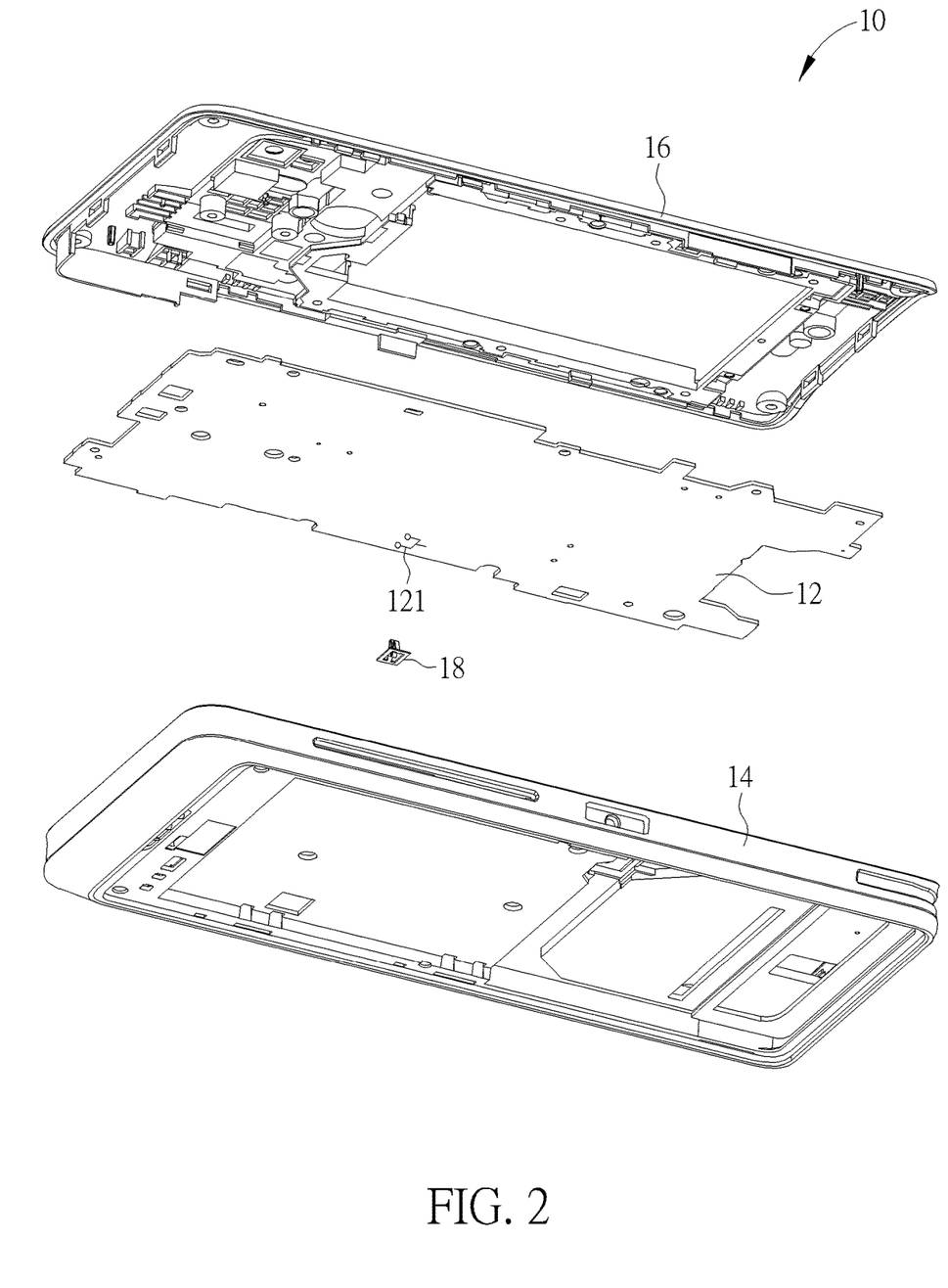
FIG. 2 is an exploded diagram of the electronic device according to the embodiment of the present invention.

Please refer to FIG. 1 and FIG. 2. FIG. 1 is a diagram of an electronic device 10 according to an embodiment of the present invention. FIG. 2 is an exploded diagram of the electronic device 10 according to the embodiment of the present invention. The electronic device 10 can be an apparatus of storing important data, such as the POS (point of sale) system. The electronic device 10 can at least include a circuit board 12, a first case 14, a second case 16, and a connector 18. The first case 14 and the second case 16 can respectively be a front case and a rear case of the electronic device 10. The front case may have some space to accommodate a display screen and an operation panel. The rear case may have a detachable back cover, or have a charging hole or a data transmission hole, which depends on an actual demand.

The first case 14 can be assembled with the second case 16 in a detachable manner, so as to form an accommodating space 20. The circuit board 12 can be disposed on the first case 14 and located inside the accommodating space 20. The circuit board 12 can have a memory unit (which is not marked in the figures) used to store the important data. For preventing the data stored in the circuit board 12 from being stolen by detaching the cases of the electronic device 10, the present invention can utilize a resiliently deformable property of the connector 18 to immediately detect whether the first case 14 and the second case 16 are assembled with or disassembled from each other, so as to decide whether to automatically switch an operation mode of the circuit board 12 for protecting the stored data. Therefore, the circuit board 12 can have a plurality of operation modes, such as a first operation mode that allows reading of the stored data, and a second operation mode that shuts down the reading function.

The connector 18 can be disposed on the first case 14, and located adjacent to the circuit board 12 and the second case 16. The connector 18 can contact against the second case 16 in a separable manner. As if the second case 16 is not assembled with the first case 14, a gap can be formed between the connector 18 and the circuit board 12, and the connector 18 can be stayed in an initial state and not contact against a switch circuit 121 of the circuit board 12. When the second case 16 is assembled with the first case 14, the connector 18 can be pressed by the second case 16 and switched from the initial state to a deformed state, and therefore the connector 18 can contact two nodes of the switch circuit 121, so as to switch the circuit board 12 into the first operation mode. When the second case 16 is disassembled from the first case 14, an external force of the second case 16 applied to the connector 18 is removed or reduced, the connector 18 can be resiliently recovered and switched from the deformed state to the initial state for being separated from the switch circuit 121, and the circuit board 12 can be triggered and switched from the first operation mode to the second operation mode.

Figure 3:
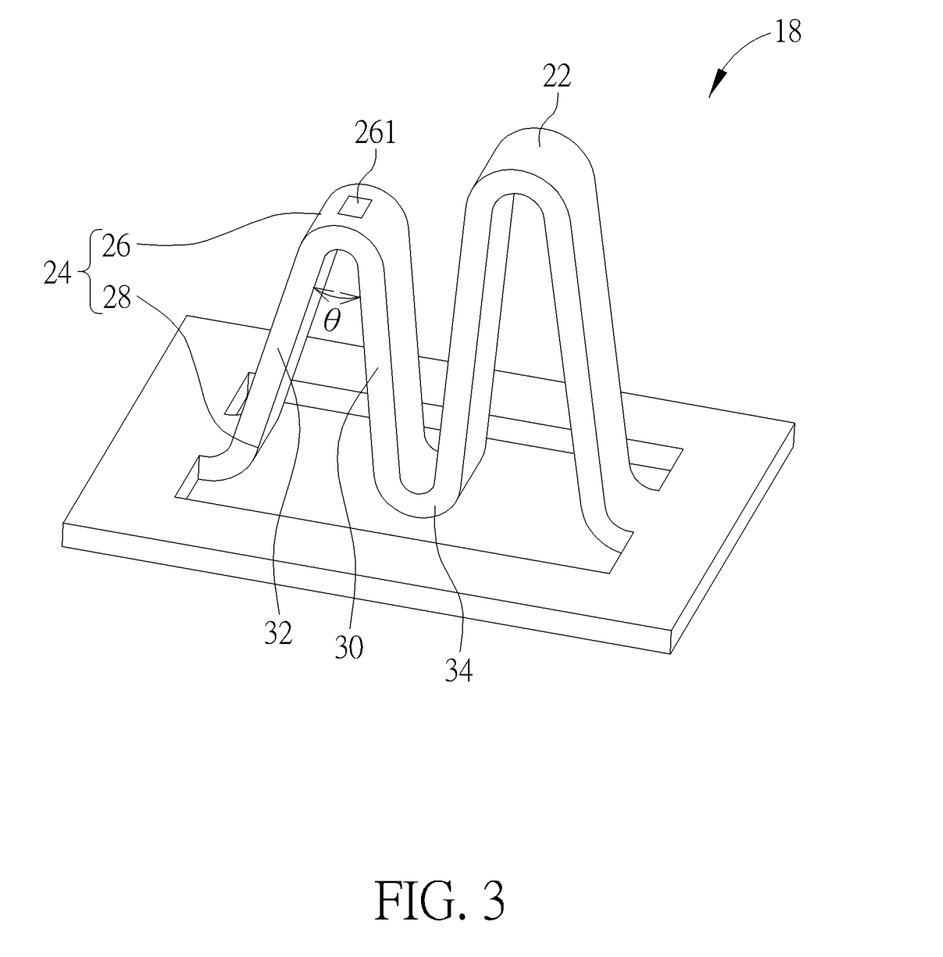
FIG. 3 is a diagram of a connector according to a first embodiment of the present invention.
Figure 4:
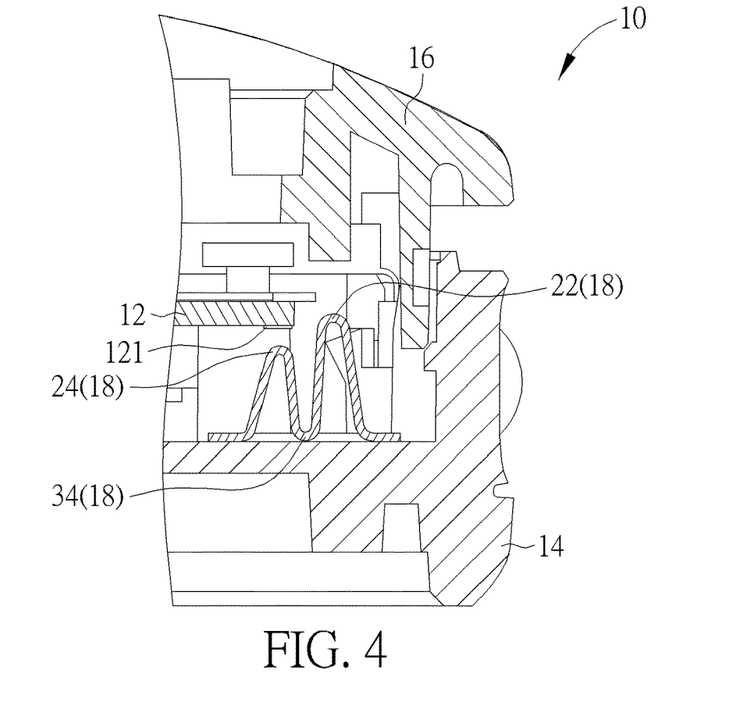
FIG. 4 and FIG. 5 are sectional views of the electronic device in different operation phases according to the first embodiment of the present invention.
Figure 5:
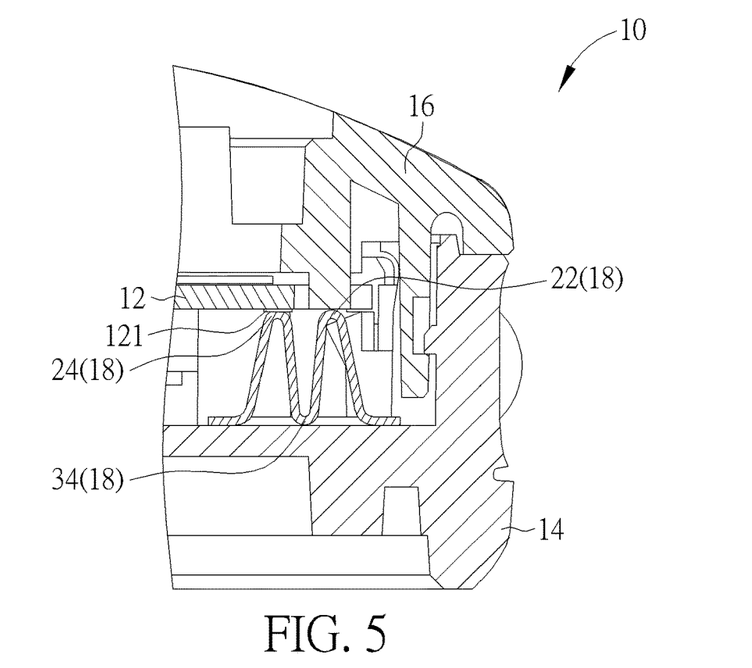

Please refer to FIG. 3 to FIG. 5. FIG. 3 is a diagram of the connector 18 according to a first embodiment of the present invention. FIG. 4 and FIG. 5 are sectional views of the electronic device 10 in different operation phases according to the first embodiment of the present invention. The connector 18 can include a first contacting portion 22 and a second contacting portion 24. The connector 18 can be a M-typed structure in symmetry or in asymmetry. The first contacting portion 22 and the second contacting portion 24 can be two top points of the M-typed structure, and a type of the connector 18 is not limited to the above-mentioned embodiment. When the first contacting portion 22 is pressed by the second case 16, the second contacting portion 24 can be driven to deform or recover and contact against the circuit board 12; when the first contacting portion 22 is separated from the second case 16, the second contacting portion 24 can be resiliently recovered and spaced from the circuit board 12. Therefore, the first contacting portion 22 can be preferably made of resilient material, and the second contacting portion 24 can be preferably made of conductive resilient material.

In addition, the second contacting portion 24 can further include a top portion 26 and a bottom portion 28. The top portion 26 can be made of the conductive resilient material, or a conductive element 261 can be disposed on the top portion 26 for turning on the switch circuit 121. A vertical height of the top portion 26 relative to the bottom portion 28 can be increased or decreased in accordance with a deformation result of the connector 18. As shown in FIG. 4, the first case 14 and the second case 16 are separated, and the connector 18 can be stayed in the initial state; meanwhile, the height of the top portion 26 relative to the bottom portion 28 can be set at a lower level, and the top portion 26 cannot contact against the switch circuit 121 of the circuit board 12. As shown in FIG. 5, when the second case 16 is assembled with the first case 14, the first contacting portion 22 can be pressed to deform or recover the second contacting portion 24, and the top portion 26 can be lifted relative to the bottom portion 28 to contact against the switch circuit 121 of the circuit board 12. Therefore, pressure applied to the first contacting portion 22 can be reduced or removed by disassembling the second case 16 from the first case 14, and the connector 18 can be deformed immediately in response to disassembly of the second case 16 and the first case 14, so that the top portion 26 of the second contacting portion 24 can be separated from the switch circuit 121 to automatically switch the operation mode of the circuit board 12.

In one possible embodiment, the two nodes of the switch circuit 121 can be arranged in a direction perpendicular to a moving direction of the top portion 26 of the second contacting portion 24. The top portion 26 of the second contacting portion 24 can simultaneously contact against the two nodes of the switch circuit 121. Moreover, the two nodes of the switch circuit 121 may be optionally stretched along the moving direction of the top portion 26, so as to reduce tolerance requirement on the connector and related installation; the top portion 26 of the second contacting portion 24 can be electrically connected to the two nodes of the switch circuit 121 when contacting against the switch circuit 121.

Besides, the second contacting portion 24 can optionally include a first section 30 and a second section 32 connected to each other. Any of the first section 30 and the second section 32 can be a straight-typed element, or an arc-typed element, or an element with a bending corner, which depends on the actual demand. An included angle θ between the first section 30 and the second section 32 can be an acute angle. When the first contacting portion 22 is pressed, the first section 30 can be driven to move toward the second section 32, so that the included angle θ can be decreased to lift the top portion 26; when the pressured applied to the first contacting portion 22 is reduced or removed, the first section 30 can be moved away from the second section 32 to increase the included angle θ, so that the top portion 26 can be lowered to separate from the switch circuit 121. Therefore, the vertical height of the top portion 26 relative to the bottom portion 28 can be changed in accordance with variation of the included angle θ between the first section 30 and the second section 32.

The connector 18 can further include a holding portion 34 connected between the first contacting portion 22 and the second contacting portion 24. The holding portion 34 can be a middle part of the M-typed structure, which means the first section 30 can belong to a part of the holding portion 34. The first contacting portion 22 can utilize the holding portion 34 to drive deformation or reposition of the second contacting portion 24 in response to the connector 18 being pressed by or separated from the second case 16, and the second contacting portion 24 can contact against or be spaced from the switch circuit 121 of the circuit board 12 accordingly. In the first embodiment, the holding portion 34 can slidably abut against the first case 14 when the connector 18 is switched between the deformed state and the initial state, so as to effectively maintain stability of the connector 18 during state transition.

Figure 6:
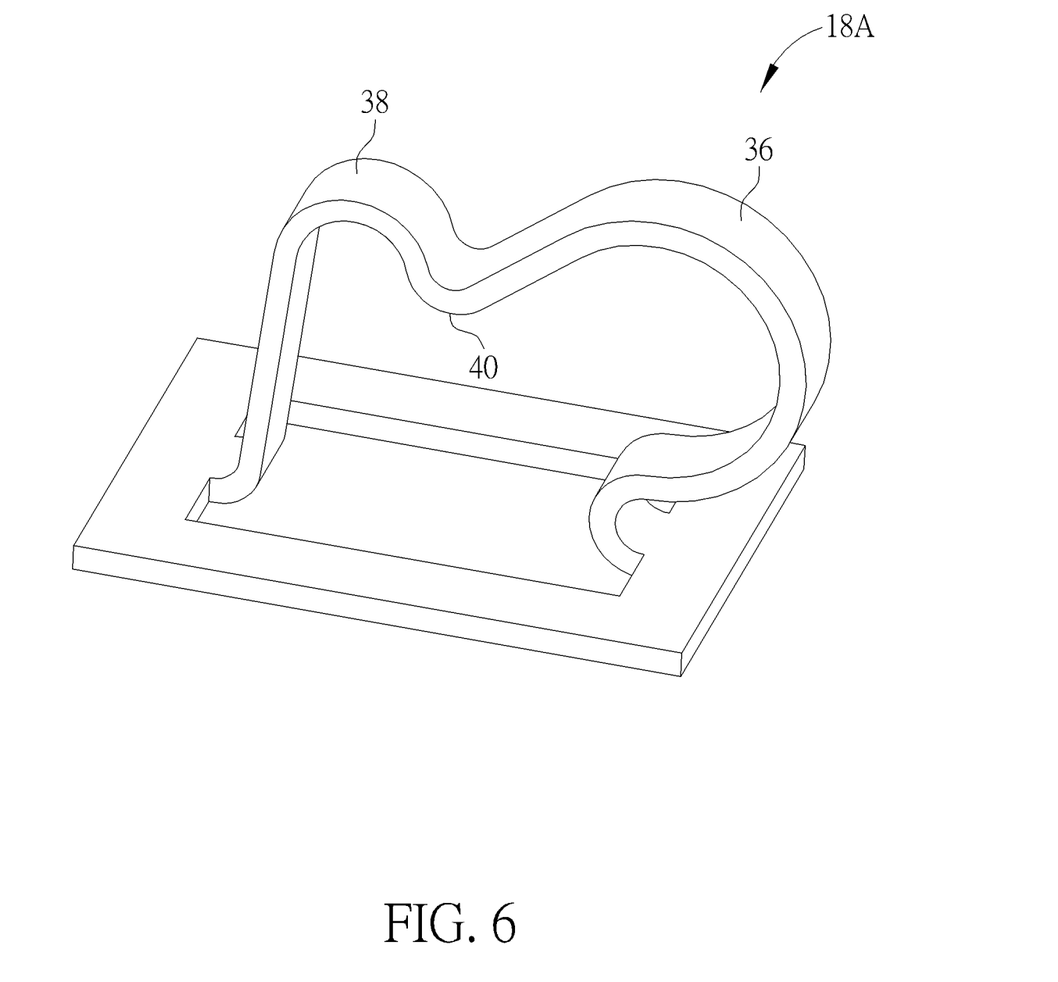
FIG. 6 is a diagram of a connector according to a second embodiment of the present invention.
Figure 7:
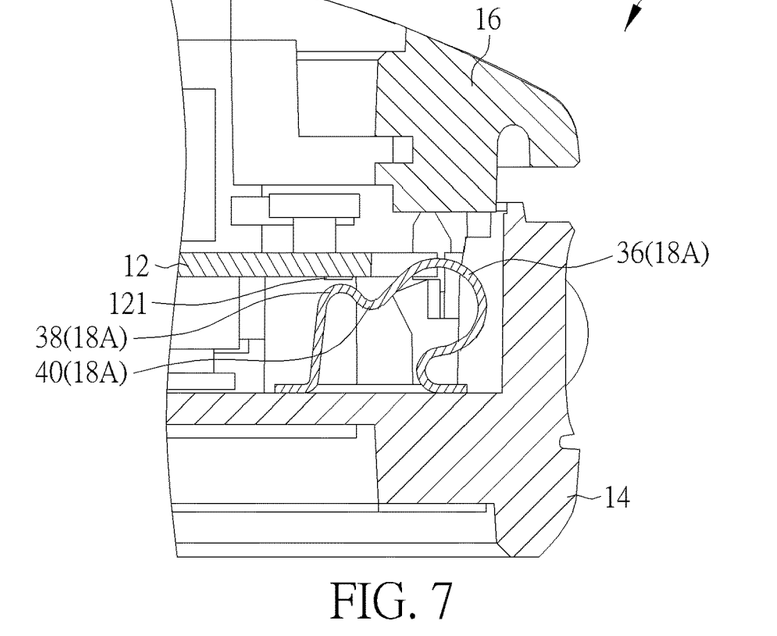
FIG. 7 and FIG. 8 are sectional views of the electronic device in different operation phases according to the second embodiment of the present invention.
Figure 8:
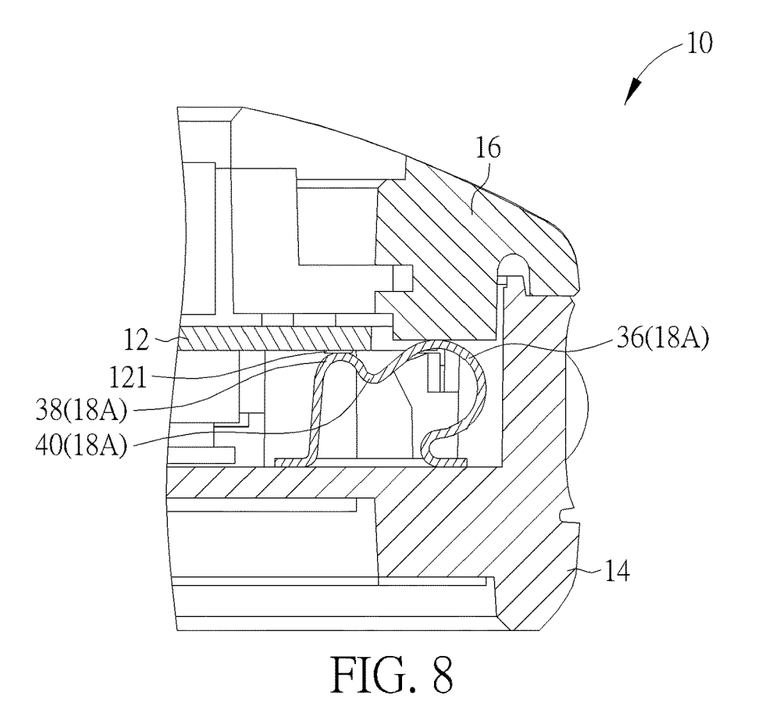

Please refer to FIG. 6 to FIG. 8. FIG. 6 is a diagram of a connector 18A according to a second embodiment of the present invention. FIG. 7 and FIG. 8 are sectional views of the electronic device 10 in different operation phases according to the second embodiment of the present invention. In the second embodiment, elements having the same numerals as ones of the first embodiment have the same structures and functions, and a detailed description is omitted herein for simplicity. The connector 18A can include a first contacting portion 36, a second contacting portion 38, and a holding portion 40. The holding portion 40 can be connected between the first contacting portion 36 and the second contacting portion 38, and suspended above the first case 14. As shown in FIG. 7, the connector 18A can be stayed in the initial state when the first case 14 and the second case 16 are separated, so that the second contacting portion 38 can be located at the lower level and cannot contact against the switch circuit 121 of the circuit board 12. As shown in FIG. 8, when the second case 16 is assembled with the first case 14, the first contacting portion 36 can be pressed and utilize the holding portion 40 to deform or recover the second contacting portion 38, and the second contacting portion 38 can be lifted to contact against the switch circuit 121 of the circuit board 12. If the second case 16 is disassembled from the first case 14, the pressure applied to the first contacting portion 36 can be reduced or removed, the connector 18A can be switched from the deformed state to the initial state immediately, and the second contacting portion 38 can be separated from the switch circuit 121 to automatically switch the operation mode of the circuit board 12.

Figure 9:
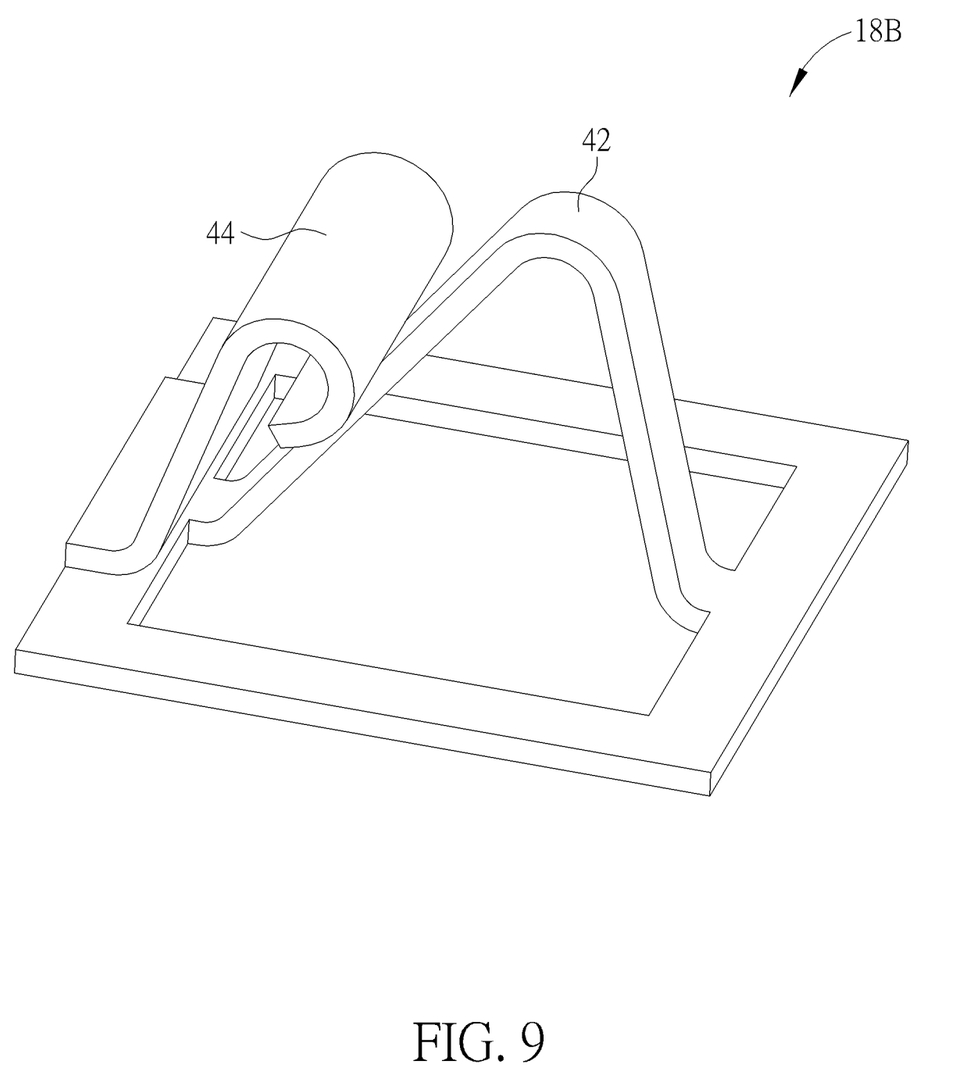
FIG. 9 is a diagram of a connector according to a third embodiment of the present invention.
Figure 10:
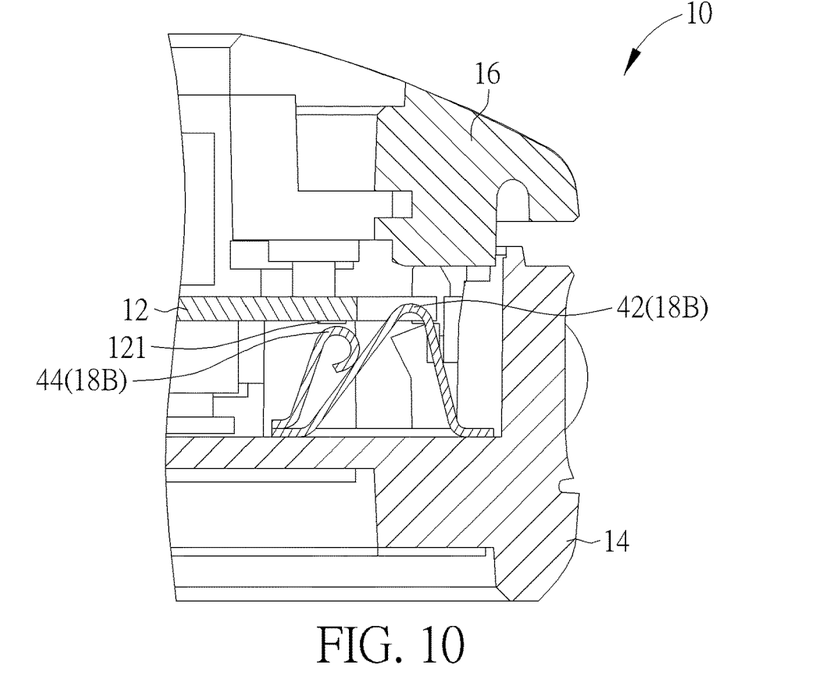
FIG. 10 and FIG. 11 are sectional views of the electronic device in different operation phases according to the third embodiment of the present invention.
Figure 11:
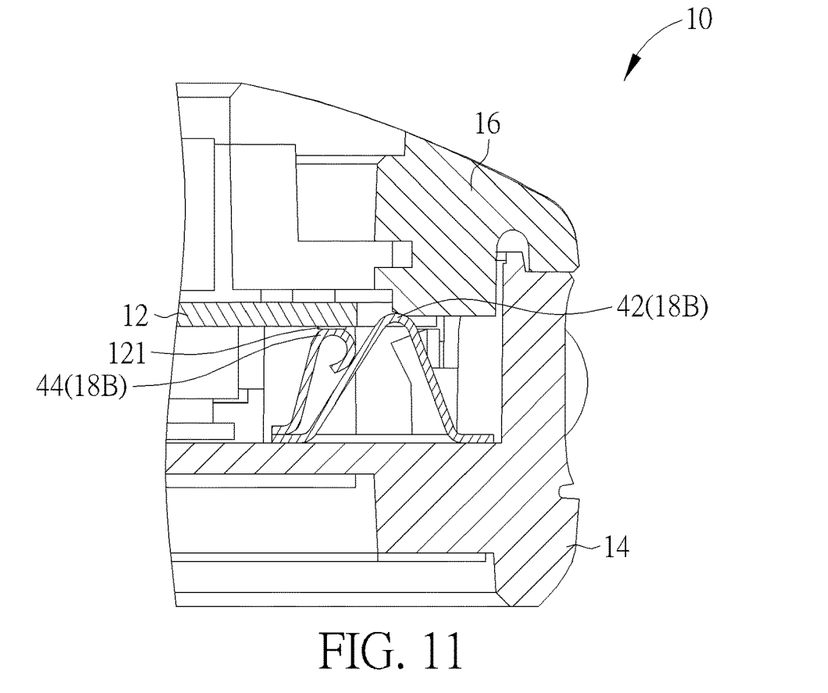

Please refer to FIG. 9 to FIG. 11. FIG. 9 is a diagram of a connector 18B according to a third embodiment of the present invention. FIG. 10 and FIG. 11 are sectional views of the electronic device 10 in different operation phases according to the third embodiment of the present invention. In the third embodiment, elements having the same numerals as ones of the foresaid embodiments have the same structures and functions, and the detailed description is omitted herein for simplicity. The connector 18B can include a first contacting portion 42 and a second contacting portion 44. The first contacting portion 42 and the second contacting portion 44 can be two independent elements. The second contacting portion 44 can contact against the first contacting portion 42 in the separable manner, and a width of the first contacting portion 42 can be preferably smaller than a width of the second contacting portion 44. As shown in FIG. 10, when the first case 14 and the second case 16 are separated, the connector 18B can be stayed in the initial state, and the second contacting portion 44 can be located at the lower level and cannot contact against the switch circuit 121 of the circuit board 12. As shown in FIG. 11, when the second case 16 is assembled with the first case 14, the first contacting portion 42 can be pressed to drive deformation or reposition of the second contacting portion 44, and the second contacting portion 44 can be lifted to contact against the switch circuit 121 of the circuit board 12. When the second case 16 is disassembled from the first case 14, the pressure applied to the first contacting portion 42 can be reduced or removed, and the connector 18B can be immediately deformed to separate the second contacting portion 44 from the switch circuit 121 for automatically switching the operation mode of the circuit board 12.

In conclusion, the electronic device of the present invention can utilize the connector to detect whether the first case and the second case are assembled with or disassembled from each other. The connector can include the first contacting portion and the second contacting portion with the same or different structural heights. Height difference in the first contacting portion and the second contacting portion can depend on inner design of the electronic device. The first contacting portion can be equipped with the second contacting portion, and the first contacting portion and the second contacting portion can respectively contact against the second case and the circuit board. If a locking mechanism between the first case and the second case is slightly unfixed, the pressure of the second case applied to the connector can be immediately changed, and the connector can be resiliently deformed to separate the second contacting portion from the switch circuit, so as to trigger the circuit board to shut down the reading function and avoid the data from theft. The data stored in the circuit board cannot be read even if the second case is locked back to the first case, and the circuit board can optionally output a warning message to an owner of the electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device having a function of automatically switching operation modes, the electronic device comprising:
    a circuit board having a first operation mode and a second operation mode;
    a first case;
    a second case assembled with the first case to form an accommodating space, the circuit board being accommodated inside the accommodating space; and
    a connector disposed on the first case and electrically connected to the circuit board, the connector comprising:
        a first contacting portion; and
        a second contacting portion equipped with the first contacting portion, the first contacting portion being pressed by the second case and driving deformation of the second contacting portion, so as to contact the second contacting portion against the circuit board to keep the circuit board in a first operation mode, the second contacting portion being resiliently recovered to switch the circuit board into a second operation mode when the second case is removed.

2. The electronic device of claim 1, wherein the first contacting portion is made of resilient material, and the second contacting portion is made of conductive resilient material.

3. The electronic device of claim 1, wherein the second contacting portion comprises a top portion and a bottom portion, a vertical height of the top portion relative to the bottom portion is increased or decreased in accordance with a deformation result, the circuit board comprises a switch circuit, and the top portion simultaneously contacts two nodes of the switch circuit to switch the circuit board into the first operation mode.

4. The electronic device of claim 1, wherein the second contacting portion comprises a top portion, a conductive element is disposed on the top portion and used to contact against or separate from a switch circuit of the circuit board via motion of the first contacting portion.

5. The electronic device of claim 1, wherein a width of the first contacting portion is smaller than a width of the second contacting portion.

6. The electronic device of claim 1, wherein the second contacting portion comprises a first section and a second section connected to each other, an included angle between the first section and the second section is increased or decreased via motion of the first contacting portion.

7. The electronic device of claim 1, wherein the connector further comprises a holding portion connected between the first contacting portion and the second contacting portion, the holding portion slidably abuts against the first case, and the first contacting portion utilizes the holding portion to deform or recover the second contacting portion.

8. The electronic device of claim 1, wherein the connector further comprises a holding portion connected between the first contacting portion and the second contacting portion, and suspended above the first case, the first contacting portion guides the holding portion to push or pull the second contacting portion for deformation or reposition.

9. The electronic device of claim 1, wherein the second contacting portion contacts against the first contacting portion in a separable manner.

10. An electronic device having a function of automatically switching operation modes, the electronic device comprising:
a circuit board having a plurality of operation modes;
a first case, the circuit board being disposed on the first case;
a second case assembled with the first case in a detachable manner; and
a connector disposed on the first case and contacting against the second case in a separable manner, the connector being deformed to trigger the circuit board for switching its operation mode in response to the second case disassembled from the first case;
wherein the connector comprises a first contacting portion and a second contacting portion, the first contacting portion is pressed by the second case, and the second contacting portion is driven by the first contacting portion to contact against or separate from the circuit board.

11. The electronic device of claim 10, wherein the connector contacts against and turns on a switch circuit of the circuit board when the connector is pressed by the second case and stayed in a deformed state, the connector is separated from and turns off the switch circuit when the connector is not pressed by the second case and stayed in an initial state.

12. The electronic device of claim 10, wherein the first contacting portion is made of resilient material, and the second contacting portion is made of conductive resilient material.

13. The electronic device of claim 10, wherein the second contacting portion comprises a top portion and a bottom portion, a vertical height of the top portion relative to the bottom portion is increased or decreased in accordance with a deformation result, the circuit board comprises a switch circuit, and the top portion simultaneously contacts two nodes of the switch circuit to switch the operation mode of the circuit board.

14. The electronic device of claim 10, wherein the second contacting portion comprises a top portion, a conductive element is disposed on the top portion and used to contact against or separate from a switch circuit of the circuit board via motion of the first contacting portion.

15. The electronic device of claim 10, wherein a width of the first contacting portion is smaller than a width of the second contacting portion.

16. The electronic device of claim 10, wherein the second contacting portion comprises a first section and a second section connected to each other, the first section is disposed on the first case and used to hold the second section stayed between the first case and the circuit board, an included angle between the first section and the second section is increased or decreased via motion of the first contacting portion.

17. The electronic device of claim 10, wherein the connector further comprises a holding portion connected between the first contacting portion and the second contacting portion, the holding portion slidably abuts against the first case, and the first contacting portion utilizes the holding portion to deform or recover the second contacting portion.

18. The electronic device of claim 10, wherein the connector further comprises a holding portion connected between the first contacting portion and the second contacting portion, and suspended above the first case, the first contacting portion guides the holding portion to push or pull the second contacting portion for deformation or reposition.

19. The electronic device of claim 10, wherein the second contacting portion contacts against the first contacting portion in a separable manner.

* * * * *